Patented Jan. 25, 1927.

1,615,271

UNITED STATES PATENT OFFICE.

MINER L. HARTMANN, OF NIAGARA FALLS, NEW YORK, ASSIGNOR TO THE CARBORUNDUM COMPANY, OF NIAGARA FALLS, NEW YORK, A CORPORATION OF PENNSYLVANIA.

ABRASIVE ARTICLE.

No Drawing. Application filed March 14, 1924. Serial No. 699,310.

This invention relates to an improvement in abrasive articles. In their usual form, abrasive articles are made up of hard particles of crystalline mineral material, such as silicon carbide, emery, fused alumina, and aluminous materials commonly known in the trade as aloxite, alundum, and the like, held together by bonding agents, such as fused silicates, glue, shellac, rubber, redmanol, Portland cement, magnesium oxychloride cement, etc.

I have discovered that certain defects of abrasive articles may be obviated or lessened by the impregnation of the abrasive article by sulphur. Inasmuch as all abrasive articles are more or less porous, sulphur may be easily introduced into the pores, thereby giving the abrasive article new and valuable properties.

By the use of sulphur in this manner, the mechanical strength of abrasive articles may be greatly increased. Bonding materials such as Portland cement, plaster, magnesium oxychloride, silicate of soda and the like, which in many cases are not sufficiently strong for certain abrasive operations, are so much strengthened by the impregnation of the articles by sulphur that they may be successfully used. For example, in the abrasion of soft or malleable materials, such as aluminum or copper, the sulphur prevents the sticking of the abraded materials in the pores of the abrasive wheel or article, thereby preventing the decrease in free cutting quality of the abrasive article. Abrasive appliances made from abrasive grain and bonding materials which are not sufficiently resistant to water or other liquids used in grinding operations, may be made entirely resistant to these liquids by the use of this invention, that is, the impregnation of the articles by elementary sulphur. In certain grinding operations, such as polishing of marble or of stone, the abrading action may be "softened" by the impregnation of the wheel or rubbing stone with sulphur.

As an illustration of the method of using this invention, I may use, for example, an abrasive wheel made by bonding carborundum grains with fused silicate. This wheel is immersed in a bath of molten elementary sulphur which is allowed to come to the temperature at which the sulphur is very liquid. As is well known, sulphur, when heated, first melts, becomes quite liquid, then as the temperature increases becomes viscous, after which it again becomes very liquid. Either of these ranges of high fluidity may be employed for the impregnation of the abrasive articles. By the immersion and heating of the article in this manner in molten sulphur, I have found that the air entrapped in the pores of the article is removed and that the sulphur penetrates through the article. With very dense articles, however, it might be necessary to employ a vacuum to remove the entrapped air and my invention contemplates this step where required. After the bath has cooled sufficiently to solidify the sulphur within the pores of the wheel, the latter is removed, the excess sulphur taken off by any convenient means and the wheel used in the familiar manner of grinding appliances. Such a wheel may be used very successfully for the grinding of soft metals which tend to clog up or fill the pores of the wheel. The presence of the sulphur in the pores of the abrasive article prevents this penetration and sticking by the soft metals. I do not limit my invention to cooling the bath to solidify the sulphur in the pores of the article, as in some cases, the article may be removed from the bath without cooling the latter and the sulphur be caused to solidify in the pores of the article by cooling the article in the air or by subjecting it to the action of a cooling medium.

Various other well known abrasive articles may be improved by the use of sulphur in the manner described. As another example, Portland cement has been used to some extent as a bond for abrasive grains, but it has usually been found to be too weak for most grinding operations. By the impregnation with sulphur of a Portland cement bonded abrasive wheel in the manner described above, I have found that the mechanical properties of the wheel are so greatly improved that such a wheel may be used for the grinding of wood pulp for paper.

While I have described only two of the possible applications of my invention, I do not limit myself to these examples, but may use this invention to improve any kind of abrasive article by impregnation thereof with sulphur.

I claim:

1. An artificial granular abrasive article composed of abrasive grains and a binder and having the pores thereof filled with sulphur.

2. An artificial abrasive comprised of a porous mass of abrasive grains and an inorganic binder and having the pores thereof filled with sulphur.

3. An artificial abrasive consisting of abrasive grains bonded with Portland cement and having the interstices thereof filled with elementary sulphur.

4. In a method of improving a formed porous abrasive article held together by an inorganic bonding agent, the step consisting in impregnating said article with sulphur.

5. In a method of improving a porous abrasive article held together by an inorganic bonding agent, the steps consisting in immersing said article in molten sulphur, raising the temperature of the sulphur to drive out air in the article whereby the interstices in the article will be filled with sulphur, the sulphur being maintained during at least part of the operation at a temperature where it is fluid, removing the article from the sulphur, and cooling the article to solidify the sulphur in the pores thereof.

6. The method of improving an abrasive article composed of abrasive grains held together by a bonding material, comprising immersing said article in a bath of molten sulphur at a temperature sufficient to remove the air entrapped in the pores of the article and allow said pores to fill with the molten sulphur, and solidifying the sulphur within the pores of the abrasive article by cooling.

7. The method of improving an abrasive article composed of abrasive grains held together by an inorganic binding material, comprising immersing said article in a bath of molten sulphur at a temperature sufficient to remove the air entrapped in the pores of the article and allowing said pores to fill with the molten sulphur, allowing the bath to cool to solidify the sulphur within the pores of the abrasive article, and then removing the article from the bath and removing excess sulphur therefrom.

In testimony whereof I have hereunto set my hand.

MINER L. HARTMANN.